United States Patent
Nedderman

(10) Patent No.: US 8,566,809 B1
(45) Date of Patent: *Oct. 22, 2013

(54) APPARATUS, SYSTEM AND METHOD FOR VALIDATING NETWORK COMMUNICATIONS DATA

(75) Inventor: Scott Nedderman, Monroe, CT (US)

(73) Assignee: Priceline.com Incorporated, Stamford, CT (US)

( * ) Notice: Subject to any disclaimer, the term of this patent is extended or adjusted under 35 U.S.C. 154(b) by 1035 days.

This patent is subject to a terminal disclaimer.

(21) Appl. No.: 12/566,606

(22) Filed: Sep. 24, 2009

Related U.S. Application Data

(63) Continuation of application No. 09/708,109, filed on Nov. 3, 2000, now Pat. No. 7,617,491.

(60) Provisional application No. 60/177,463, filed on Jan. 20, 2000, provisional application No. 60/178,987, filed on Jan. 28, 2000, provisional application No. 60/180,072, filed on Feb. 3, 2000.

(51) Int. Cl.
G06F 9/44 (2006.01)
G06F 9/45 (2006.01)
G06F 17/00 (2006.01)

(52) U.S. Cl.
USPC ........... 717/143; 717/114; 717/115; 717/136; 715/221; 715/234; 715/237

(58) Field of Classification Search
None
See application file for complete search history.

(56) References Cited

U.S. PATENT DOCUMENTS

| | | | |
|---|---|---|---|
| 6,016,394 A | 1/2000 | Walker | |
| 6,049,665 A | 4/2000 | Branson et al. | |
| 6,167,523 A | 12/2000 | Strong | |
| 6,535,883 B1 | 3/2003 | Lee et al. | |
| 6,542,595 B1 | 4/2003 | Hemzal | |
| 6,581,093 B1 | 6/2003 | Verma | |
| 6,598,219 B1 | 7/2003 | Lau | |
| 6,654,932 B1 | 11/2003 | Bahrs et al. | |
| 6,748,569 B1 | 6/2004 | Brooke et al. | |

OTHER PUBLICATIONS

Browser Compatibility: Method Detection—Doc JavaScript, webconference.com, 1997.*
Client-Side JavaScript Reference—Regex, Netscape Communications Corporation, Copyright 1999.*
Nugent, "Addressing for Field Validation with regular Expressions and JavaScript 1.2," Nov. 1997.
Kleijnen, "Validation of Models: Statistical Techniques and Data Availability", 1999.

* cited by examiner

*Primary Examiner* — Insun Kang
(74) *Attorney, Agent, or Firm* — Cooley LLP; Walter G. Hanchuk; Nathan W. Poulsen

(57) ABSTRACT

An apparatus, system, and method for the improved validation of information across a communications network provide a common validation rules library that may be accessed and executed either by a client or server. The provision of a minimal amount of logic either to the client or the server is achieved by generating only a requisite amount of validation logic. Furthermore, developers are enabled to reuse and build upon validation logic by subsequent validation logic inheriting validation logic from a parent rule.

47 Claims, 9 Drawing Sheets

APPARATUS, SYSTEM AND METHOD FOR VALIDATING NETWORK COMMUNICATIONS DATA

CROSS-REFERENCE TO RELATED APPLICATIONS

This is a Continuation of prior U.S. patent application Ser. No. 09/708,109, now U.S. Pat. No. 7,617,491, filed Nov. 3, 2003, entitled, "APPARATUS, SYSTEM AND METHOD FOR VALIDATING NETWORK COMMUNICATIONS DATA," to which priority under 35 U.S.C. §120 is claimed, which in turn claims priority to U.S. provisional applications 60/177,463, filed Jan. 20, 2000; 60/178,987, filed Jan. 28, 2000; and 60/180,072, filed Feb. 3, 2000, each of which are hereby incorporated by reference.

FIELD

The present application relates generally to computer systems and software, and more particularly to a method and system for the validation of information on a communications network.

BACKGROUND

Typically, users (i.e. people or other systems) engage computers to facilitate information processing. A computer operating system enables and facilitates users to access and operate computer information technology. Somewhat like how automobile operator interfaces (e.g. steering wheels and gearshifts) facilitate the access and operation of automobile resources and functionality, computer user interfaces facilitate (e.g. windows and cursors) the access and operation of computer hardware and operating system resources and functionality. Graphical user interfaces such as the Apple Macintosh™ Operating System or Microsoft's Windows™ 98 provide a baseline and means of accessing and displaying information. Such consumer oriented operating systems enable users to access and operate computer information technology by providing an integrated user interface. Other operating systems such as UNIX do not provide integrated graphical user interfaces and instead allow various interfaces to be employed such as command line interfaces (e.g. C-shell) and graphical user interfaces (e.g. X windows).

The proliferation and expansion of computer systems, databases, the Internet, and particularly the World Wide Web (the web), have resulted in a vast and diverse collection of information. Various user interfaces that facilitate the interaction of people with computer systems are currently in use. Tim Berners-Lee originally developed an information navigation interface called WorldWideWeb.app, i.e. the web, in late 1990 on NeXT Computer Inc.'s operating system, NeXTSTEP, at the European Organization for Nuclear Research (CERN, a particle physics center). Subsequently, information navigation interfaces, i.e. web browsers, have become widely available on almost every computer operating system platform.

Generally, the web is the manifestation and result of a synergetic interoperation between user interfaces (e.g. web browsers), servers, distributed information, protocols, and specifications. Web browsers were designed to facilitate navigation and access to information, while information servers were designed to facilitate provision of information. Typically, web browsers and information servers are disposed in communication with one another through a communications network; i.e. information servers typically provide information to users employing web browsers for navigating and accessing information about the web. Microsoft's Internet Explorer™ and Netscape Navigator™ are examples of web browsers. In addition, navigation user interface devices such as WebTV have also been implemented to facilitate web navigation. Microsoft's Information Server and Apache are examples of information servers.

Information on the web typically is provided through and distributed employing a HyperText Markup Language (HTML) specification. HTML documents are also commonly referred to as web pages. HTML documents may contain links to other HTML documents that can be traversed by users of web browsers (i.e. user interfaces) by selecting the links, which are commonly highlighted by color and underlining. HTML has been extended and upgraded resulting in new standards such as Extensible Markup Language (XML) and other such variants, which provide greater functionality. HTML's progenitors were Standardized General Markup Language (SGML), which in turn was preceded by the General Markup Language (GML). SGML is generally regarded as a more functional superset of HTML and first appeared in 1980 as a draft by the Graphic Communications Association (GCA) to the American National Standards Institute (ANSI) (GCA 101-1983); it was adopted as an international standard by the International Standards Organization (ISO) in 1986 (ISO 8879:1986). Charles Goldfarb, Edward Mosher, and Raymond Lorie invented the GML at IBM to facilitate law office information system integration and improve document processing. GML itself was inspired by William Tunnicliffe, chairman of the CGA, during a presentation on the topic of "the separation of the information content of documents from their format" at the Canadian Printing Office in September, 1967.

HTML documents typically are accessed through navigation devices via a HyperText Transfer Protocol (HTTP). HTTP is a stateless application-level protocol for distributed, collaborative, hypermedia information systems, and is further described on the W3C web site entitled HTTP Specifications and Drafts (available at "www.w3.org/Protocols/Specs.html"). Microsoft's Information Server allows the tracking of a state with a built-in session object.

The basic web browsing paradigm presents users with a scrolling page full of text, pictures, and various other forms of information media such as movies and links to other documents. Web browsers allow users to access uniquely identified HTML documents on the web by entering a navigation location in a Universal Resource Locator CURL) and employing HTTP as a transfer protocol to provide and obtain web pages. Typically, a user provides the address of a desired HTML document into a URL (either directly or through the selection of links in an already viewed HTML document).

The onset of the web has brought on a tremendous increase in transactions occurring through insecure communications networks such as the Internet. Sending information through such networks allows for the possibility of data corruption. Database systems and other transactional systems benefit from the validation of data. Increasingly, such transactions occur via web page forms. In many instances, it is critical that data acquired over a communications network be acquired in a consistent, predictable, and reliable way. Otherwise, a host of problems may result such as failed transactions, application errors, incorrect orders, irritated customers, and other such consequences.

Validation is a way to increase the reliability of data sent over a communications network. Existing validation techniques are commonly employed to ensure the integrity of data against incidents such as transmission disruptions or erroneous data entry. Existing validation logic includes, for example, pattern matching logic to ensure obtained data is in a proper form, and check sum techniques to ensure against data corruption.

The most common way to perform validations on a form has been to write a multitude of small JavaScript™ 1.0 functions that are downloaded to the client and then called right before a form is submitted. The validating logic was imbedded into the web page itself. A more recent and generic technique was developed to validate data from a form by describing the validations for each field and its dependencies and then calling generic validation procedures. The validation procedures are provided in an included file.

SUMMARY

As set forth below, a need exists for an improved apparatus, system, and method for improved validation of information across a communications network. Existing systems have the disadvantage of putting validation logic in a script into a web page resulting in an excess amount of validation logic that had to be downloaded with each page. Also, existing systems require the custom handling and development of validation logic on a per web page basis, thus greatly burdening and hindering development. Attempts to improve existing systems have failed to reduce the amount of validation logic downloaded by a user client, forcing them to download sometimes larger validation procedures in included files. Furthermore, the calling of validation procedures from an include file (i.e. a file, in this case containing large collections of validation logic, for wholesale inclusion) has not significantly improved development as the increasing number of exceptions require custom handling outside of common validation procedures.

The present application advances the art by providing a common validation rules library that may be accessed and executed either by a client or server. The present application advances the art by providing a minimal amount of logic either to the client or the server by generating only a requisite amount of validation logic. Furthermore, the present application improves development by allowing developers to reuse and build upon validation logic.

In one embodiment, the present system includes an apparatus, comprising: a memory device having at least one region for storing executable program code; and a processor, disposed in communication with the memory device, for executing the program code stored in the memory device. The program code further comprises code to receive information over a communications network, code to retrieve validation rules from a rules library, and code to determine data validity by applying the retrieved validation rules to the information.

In another embodiment, the present system involves an apparatus, comprising: a memory device having at least one region for storing executable program code; and a processor, disposed in communication with the memory device, for executing the program code stored in the memory device. The program code further comprises code to provide validation rules from a rules library, and code to validate information with provided validation rules.

In other embodiments, the present system involves (1) code to provide a rules library, and code to build validation rules by subclassing members of a rules library class hierarchy, (2) code to mark data types for associated validation rules, and code to provide validation marked data types, and/or (3) code to identify browser capability, code to choose improved validation deployment, code to provide appropriate network location and validation rules, code to obtain information from user, and code to validate information with appropriate validation rules.

BRIEF DESCRIPTION OF THE DRAWINGS

The accompanying drawings illustrate certain embodiments of the application.

DETAILED DESCRIPTION

Figure 1:
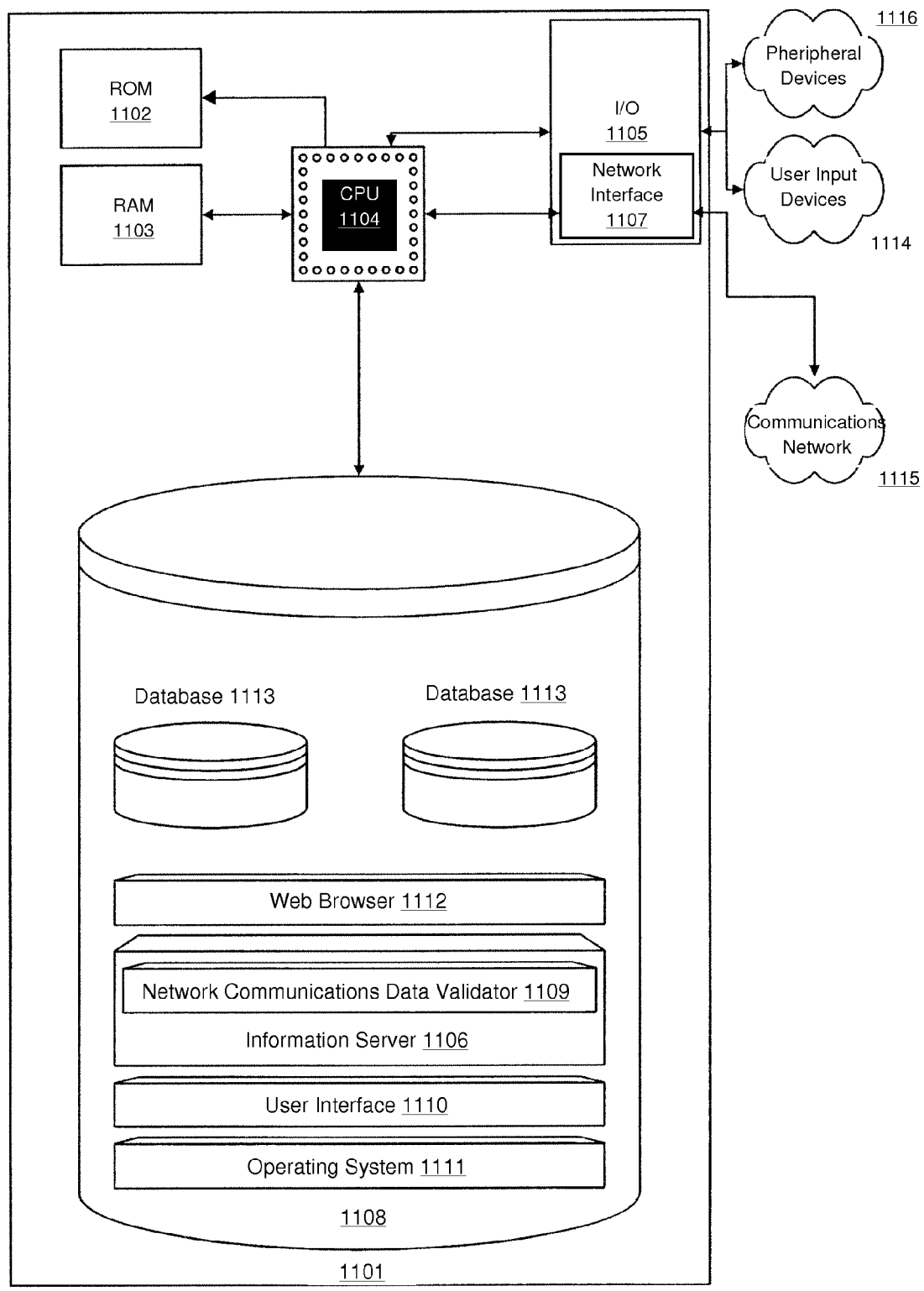
FIG. 1 illustrates a centralized controller according to one embodiment of the present application.

FIG. 1 shows one embodiment of a system incorporating the present application. In this embodiment, the system includes a centralized controller 1101 configured to receive information from one or more users from user input device(s) 1114. Also, the centralized controller may receive information from a communications network 1115 through its input/output (I/O) facility 1105, preferably, via a network interface 1107. The I/O facility is capable of both receiving and sending information. Peripheral devices 1116 may be attached to the centralized controller for any number of purposes including, but not limited to: printers for output, scanners for input, additional or alternative storage devices for data storage and retrieval, network interfaces for communication, and devices of the like.

A typical centralized controller may be based on common computer systems that may include, but are not limited to, components such as: a central processing unit (CP1J) 1104, random access memory (RAM) 1103, a computer readable medium such as read only memory (ROM) 1102, and a local storage device 1108. The CPU is electronically coupled to each of the central controller's other elements. The CPU comprises at least one high-speed data processor adequate to execute program modules for executing user or system-generated requests. These modules are described in FIGS. 2 through 9. Preferably, the CPU is a conventional microprocessor such as the Intel Pentium™ Processor. The CPU interacts with RAM, ROM, and storage device(s) to execute stored program code according to conventional data processing techniques.

The local storage device may contain modules. These modules may include, but are not limited to, a network communications data validator (NCDV) 1109, a user interface 1110, an operating system 1111, a web browser 1112, an information server 1106, and a database 1113. These modules may be stored and accessed from the local storage device(s) or from storage devices accessible through I/O. Although these modules typically and preferably are stored in a local storage device, they may also be stored in ROM, RAM, peripheral devices or in remote storage facilities through a communications network.

The operating system is executable program code enabling the operation of a centralized controller. The operating system facilitates access of storage devices, I/O, network interfaces devices, peripheral devices, etc. The operating system preferably is a conventional product such as a UNIX operating system or Microsoft Windows NT. The operating system, once executed by the CPU, interacts with ROM, RAM, I/O, peripheral devices, user input devices, storage devices, communications networks, program modules, and data, et al. Preferably, the operating system includes communication protocols that allow the centralized controller to communicate with other entities through a communications network. The preferable protocol is TCP/IP.

Figure 2:
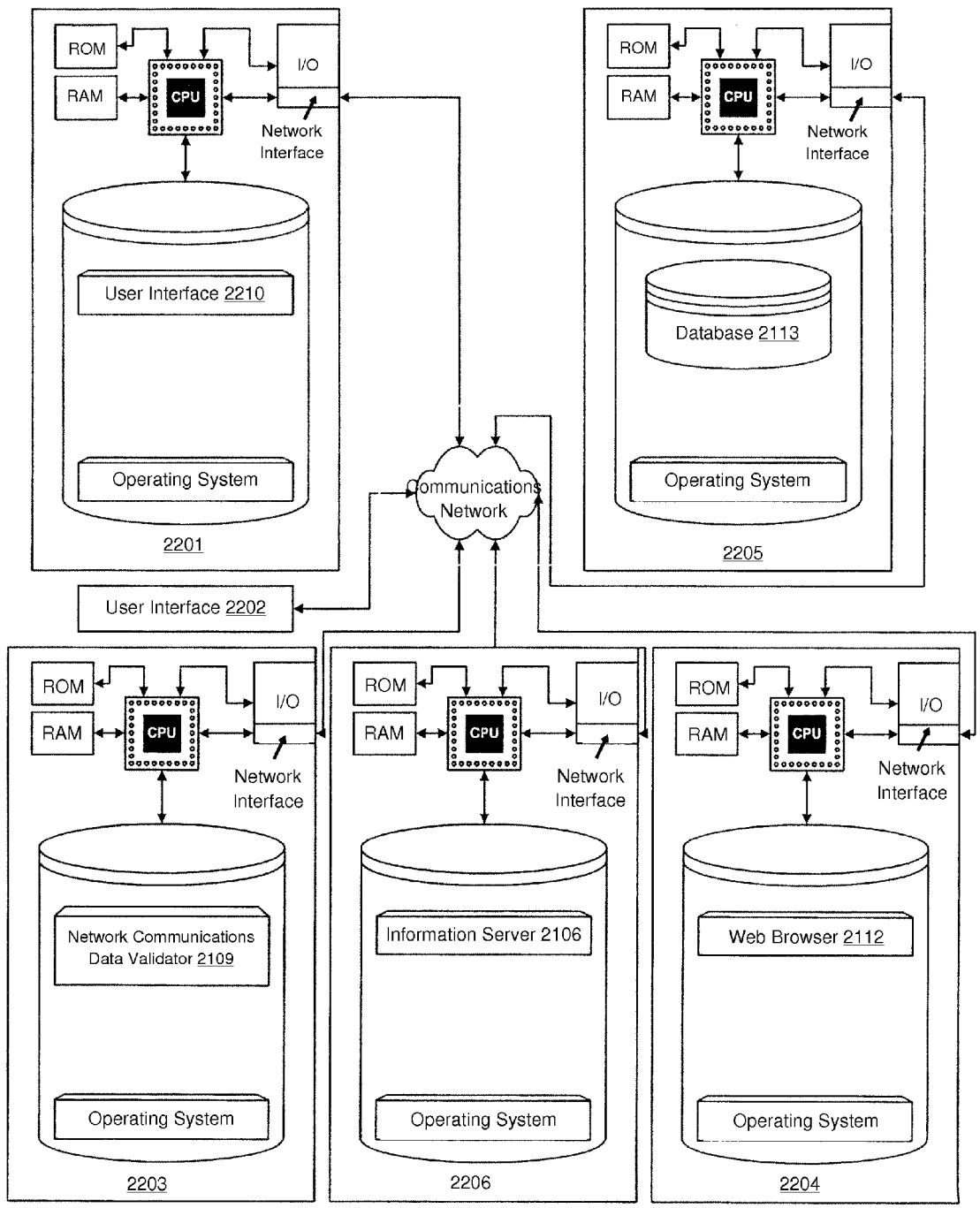
FIG. 2 illustrates another embodiment of the present application in the form of a distributed system interacting through a communications network.

FIG. 2 shows another embodiment of a system incorporating the present application. In this embodiment, the centralized controller 1101 embodiment of FIG. 1 has been decentralized into components: a user interface controller 2201 or alternatively a user interface device 2202, a network communications data validator controller 2203, a web browser controller 2204, a database controller 2205, and an information server controller 2206.

A user interface controller is configured similarly to the centralized controller of FIG. 1 except it does not require a database, NCDV, information server, or web browser. A user interface 2110 is stored program code that is executed by the CPU. The user interface is responsible for receiving either user or system-generated requests. The user interface device may be a telephone, a consumer electronics online access device (e.g. Phillips Inc.'s WebTV), PDA or the like. In alternative embodiments, a user interface device 2202 may take the place of or be used in conjunction with a user interface controller.

In one embodiment, a centralized server 1101 is configured as a web server, and conventional communications software such as Netscape Navigator web browser may be used to transmit a conditional purchase offer (CPO). In one embodiment, the CPO centralized server 1101 has a web page on the world wide web, allowing the buyer to provide information through the interface of the conventional web browser software. In one embodiment, the buyer selects the subject of the goods he wishes to purchase by selecting from a list of possible subjects. Subjects might include airline tickets, hotel rooms, rental cars, insurance, mortgages, clothing, etc. After the subject is selected, a form is displayed on a video monitor of a buyer interface. This form is an electronic contract with a number of blanks to be filled out by the buyer, with each blank representing a condition of a CPO.

An information server controller is configured similarly to the centralized controller of FIG. 1 except it does not require a NCDV, database, web browser, or user interface. An information server 2106 is a software server that is stored program code that is executed by the CPU. Preferably, the information server is a conventional Internet information server such as Microsoft's Internet Information Server version 4.0. Preferably, the information server allows for the execution of program modules through facilities such as C++, Java™, JavaScript, ActiveX™, CGI scripts, ASP, or any like facility with regular expression (regex) abilities on the server side. An information server typically takes requests from a web browser and provides results to a web browser; however, an information server can take requests from user interfaces as well. The information server may also take system requests.

In alternative embodiments, an information server may be integrated into a user interface or vice versa, thus, combining the functionality of both.

A network communications data validator controller is configured similarly to the centralized controller of FIG. 1 except it does not require a database, web browser, information server, or user interface. The NCDV 2109 is stored program code that is executed by the CPU. A NCDV takes requests from a user interface and provides results to a user interface. The NCDV may also take system requests. In FIG. 1 the NCDV is implemented within an information server, however, the NCDV may also be implemented independently and interact with an information server through provided APIs as illustrated in FIG. 2 2106 and 2109.

A database controller is configured similarly to the centralized controller of FIG. 1 except it does not require a NCDV, web browser, information server, or user interface. A database(s) 2113 is stored program code that is executed by the CPU and it is stored data processed by the CPU. A database takes requests from a NCDV and provides results to a NCDV. The database may also take system requests. In an alternative embodiment, a NCDV may be integrated into a database or vice versa, thus, combining the functionality of both. In yet another alternative embodiment, a NCDV may be integrated into a user interface or vice versa, thus, combining the functionality of both.

A web browser controller is configured similarly to the centralized controller of FIG. 1 except it does not require a NCDV, database, information server, or user interface. A web browser 2112 is stored program code that is executed by the CPU. Preferably, the web browser is a conventional hypertext viewing application such as Microsoft Internet Explorer or Netscape Navigator. Preferably, the web browser allows for the execution of program modules through facilities such as Java, JavaScript (preferably revision number 1.2 or greater), ActiveX or any like facility with regular expression (regex) abilities. A web browser takes requests from a user interface and provides results to a user interface. The web browser may also take system requests. In alternative embodiments, a web browser may be integrated into a user interface or vice versa, thus, combining the functionality of both.

The functionality of the user interface controller, network communications data validator controller, database controller, information server controller, and web browser controller may be combined in any number of ways to facilitate deployment. To accomplish this, one may simply copy the executable code, first ensuring it has been compiled for the appropriate CPU of the controller for which it is destined, and/or data onto local storage device of one of the various controllers. Similarly, the functionality of the user interface, NCDV, database, information server, and web browser may be combined in any number of ways to facilitate deployment. To accomplish this, one must simply integrate the components into one code base or in a facility that can dynamically load the components on demand in an integrated fashion.

Figure 3:
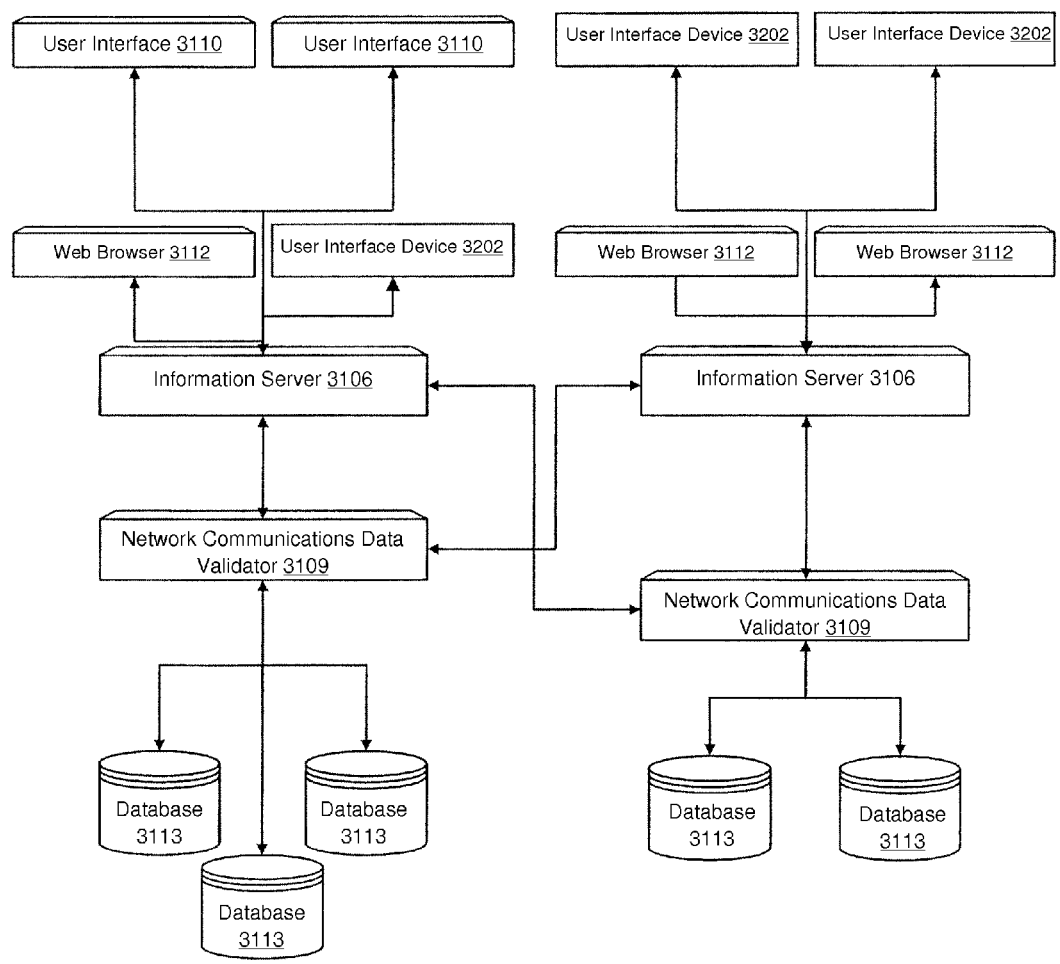
FIG. 3 illustrates another embodiment of the system and various interactions.

FIG. 3 shows an overview of the basic interaction of the system. The information server 3106 acts as an in-between for: a user interface 3110 on a system, a user interface device 3202, or a web browser 3112 taking requests. The information server can make further requests of a NCDV 3109 that itself may access one or more databases or files such as a rules library. Both the information server and the NCDV may service multiple instances of any of the aforementioned. Also, there may be one or more instances of the NCDV and/or information server that may severally or jointly interact with one or more information servers 3106. NCDV's service information servers. In turn, the information servers and/or NCDV s may interact and service one or more databases 3113 for various purposes such as, but not limited to: validation rules, session state storage, and electronic commerce (E-commerce) order fulfillment. FIG. 3 shows that the NCDV and information server may service multiple sources at once, and that the NCDV and information server may access more than one database.

Figure 4:
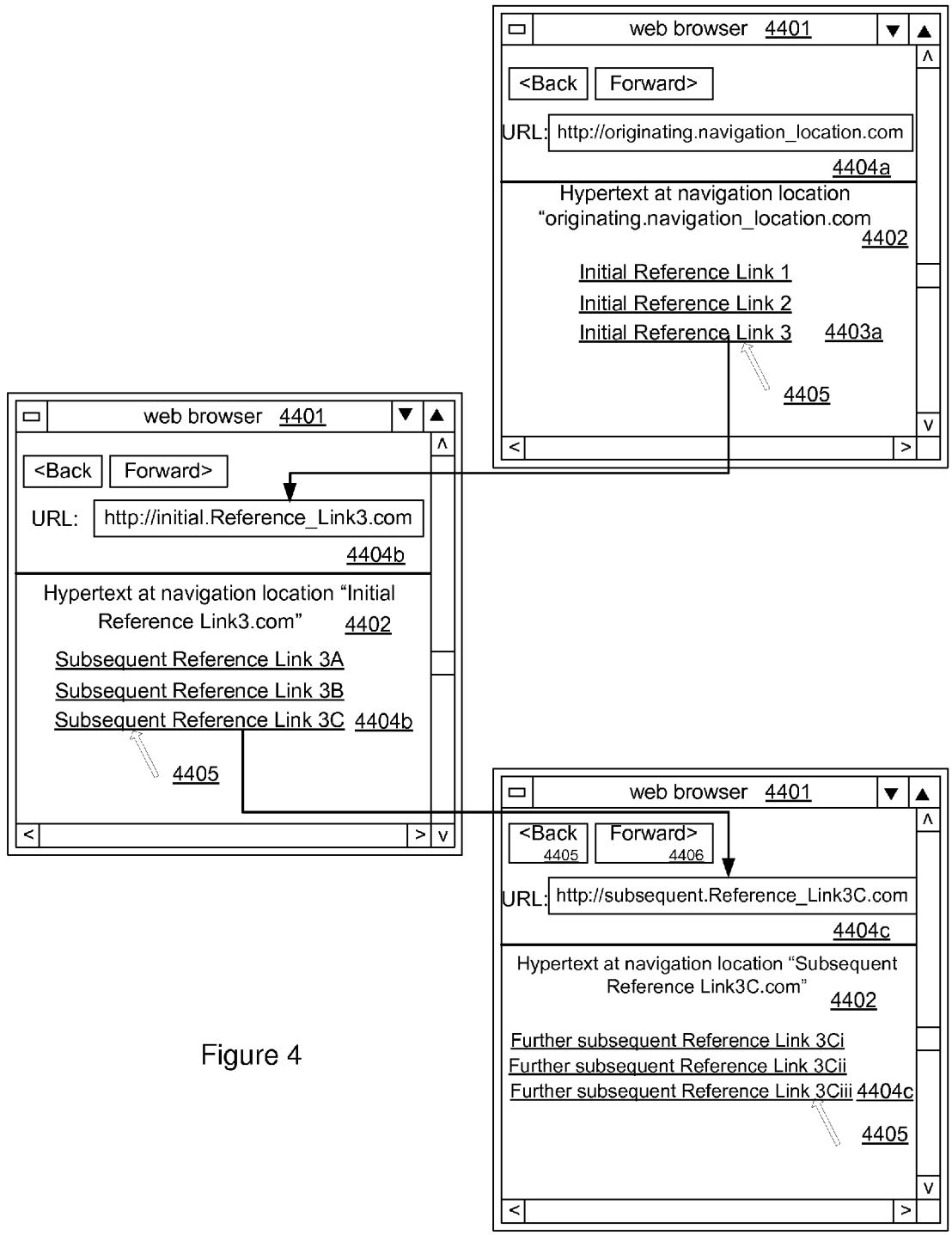
FIG. 4 illustrates web pages, hypertext, reference and proximal links.

FIG. 4 shows web pages 4401 with hypertext 4402 and reference links 4403 at various navigation locations 4404. An originating navigation location 4404*a* references hypertext that may have initial reference links 4403*a*. These initial reference links are proximal links to the originating navigation location.

One may view hypertext at an initial reference navigation location 4404*b* by traversing an initial reference link. The subsequent reference links 4403*b* found in the hypertext found at the initial reference navigation location are also proximal links, however, they are one reference less proximal (i.e. one "hop" away) to the originating navigation location.

One may view hypertext at a subsequent reference navigation location 4404*c* by traversing a subsequent reference link. The further subsequent reference links 4403*c* found in the hypertext found at the subsequent reference navigation location are also proximal links, however, they are two references less proximal (i.e. two "hops" away) to the originating navigation location.

Figure 5:
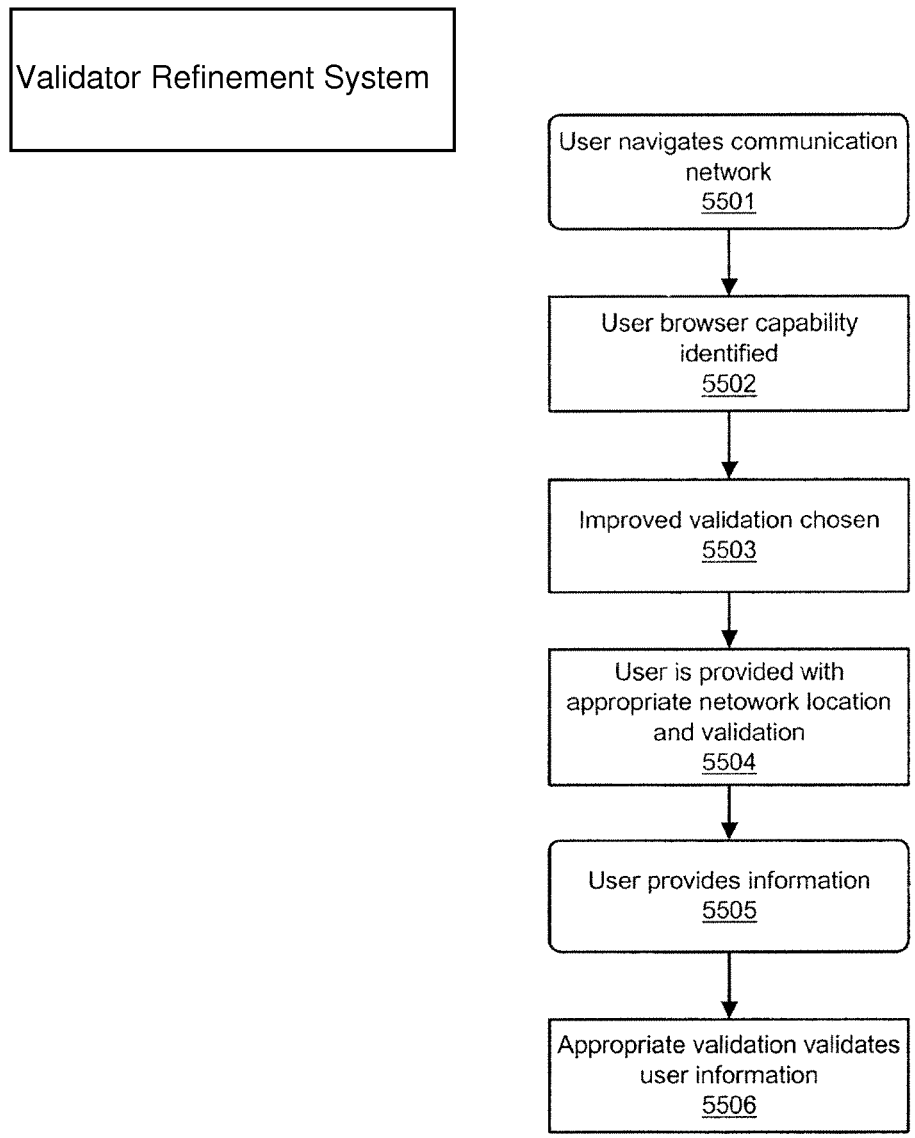
FIG. 5 is a flowchart illustrating a validator refinement system.

FIG. 5 outlines a validator refinement system. Initially, a user, or even an automated system such as a web bot, navigates a communications network 5501, for example the Internet. Navigation typically occurs via a user interface, user interface device, or web browser. A user typically navigates by positioning a pointing element 4405 of FIG. 4 by means of a positioning device such as, but not limited to, a mouse. Typically this is referred to as "surfing the Internet," "surfing the net," or simply "surfing."

Web browsers and the like keep track of the navigation location they are visiting, and can provide this information to other facilities through various application program interfaces (API)s. Web browsers' may provide their name, revision, enabled and disabled features, similarly, through APIs; also, it is possible to determine relevant feature sets of almost any web browser from its name and revision number.

Upon surfing to a navigation location with the ability to identify a web browser, the NCDV or the information server can thus identify web browser capabilities 5502 through a provided API; for example, JavaScript provides methods such as navigator.javaEnabled, navigator.appName, and navigator.appVersion for identifying the abilities, type and revision number of an employed web browser. Thus, a web page can be constructed to obtain such information, and may then further provide the NCDV or information server with the web browser identity.

Upon having identified the web browser, overall performance may be improved by choosing an appropriate validation scheme 5503. Various web browsers have equally varying capabilities that affect performance. By identifying web browser capabilities, the validator refinement system may determine which, among available, validation schemes are best. Upon having determined which validation scheme is best for the identified web browser, the validator refinement system provides the user with a navigation location at which web pages are tailored with the most appropriate validation schemes 5504. After the user navigates to the appropriate web page with appropriate validation scheme, the user may provide information into the web page 5505. In one embodiment, such provision of information is facilitated by employing web forms, however, other standard data processing techniques may also be used.

Upon provision of information by the user, the appropriate validation scheme will validate the information 5506.

Figure 6:
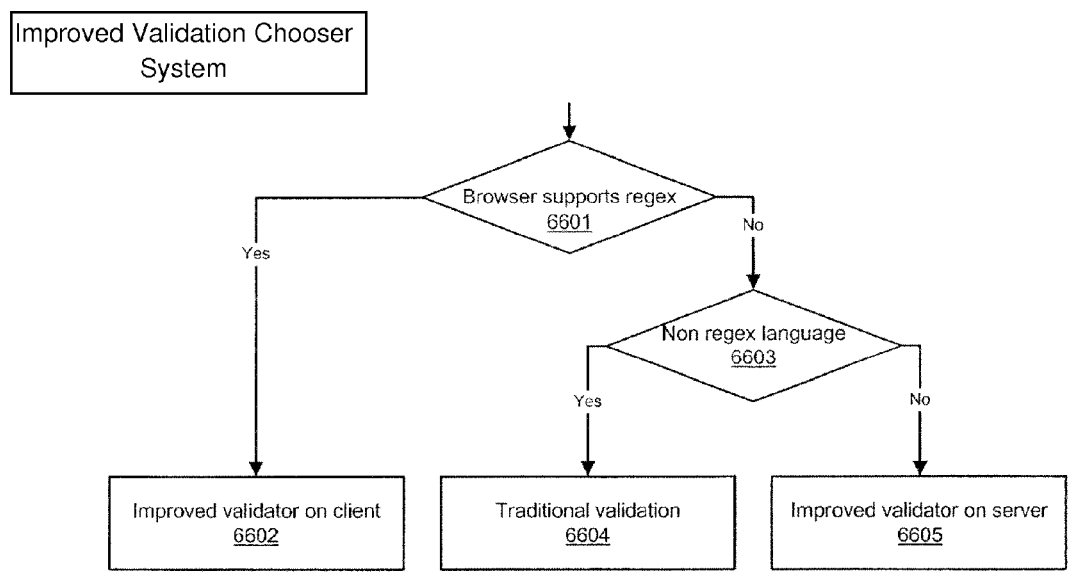
FIG. 6 is a flowchart illustrating an improved validation chooser system.

FIG. 6 outlines an improved validator chooser system, further explaining how an improved (i.e. regex enabled) validation scheme is chosen 5503 of FIG. 5. Upon having identified the browser capability 5502 of FIG. 5, the improved validator chooser system will determine, using standard data processing techniques, if the browser's supported languages, if any, support regex 6601. In one embodiment, this may be accomplished by embedding commands into a web page that will be executed upon users' traversal if their browser supports the processing of such commands. Any number of command types may be used including, but not limited to: JavaScript, Active X, Java, and others of the like. In one embodiment, JavaScript will be employed.

If users' browsers support regex, then their information provisions will be validated with an improved validator scheme on the client 6602; typically the client may take the form of a user interface such as, but not limited to a web browser (e.g. Netscape Navigator), or a user interface device (e.g. Phillips WebTV). Thus, the user will be provided with a network location 5504 of FIG. 5 that employs an improved client validator scheme. However, if users' browsers do not support regex, and there is no other (non regex) language facility provided by the web browser 6603, then users' information will be validated with an improved validator scheme on the server 6605. Thus, the user will be provided with a network location 5504 of FIG. 5 that employs an improved server validator scheme. If, however, users' browsers do not support regex, and there is a (non regex) language facility provided by the web browser 6603, then users' information will be validated with traditional validation techniques 6604; traditional validation techniques such as monolithic include files and non regex based validation via languages such as ActiveX. Thus, the user will be provided with a network location 5504 of FIG. 5 that employs traditional validation schemes.

Figure 7:
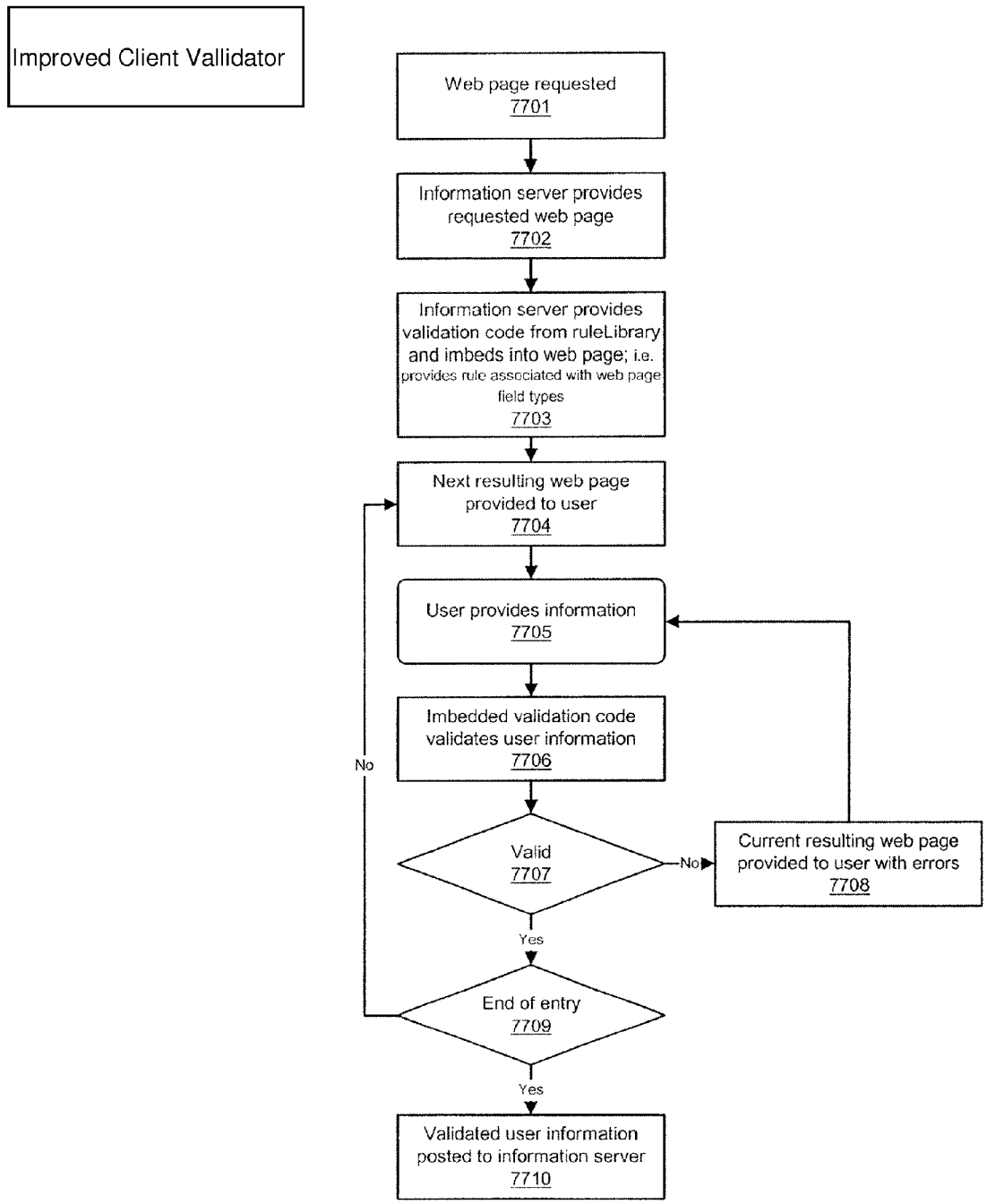
FIG. 7 is a flowchart illustrating an improved client validator.

FIG. 7 outlines an improved client validator system, further explaining how an improved validation scheme is applied to user information on a client when a browser supports regex 6602 of FIG. 6. Based on the abilities of users' web browsers, a web page is requested 7701. The information server provides and/or generates the requested page 7702 via standard web server techniques.

Upon the improved client validator system's provision of the requested web page, the information server provides and/or generates validation code from a rules library. This validation code is imbedded into the requested web page. Preferably this validation code is JavaScript revision 1.2 or greater, however, this code may be provided through other like facilities such as, but not limited to: Microsoft Visual Basic™ Script, Java applets, and others of the like. The information server provides rules from the rules library associated with web page field types; e.g. if the web page is marked as an airTravel type of page, a corresponding airTravel set of rules will be pulled from a rules library and imbedded into the requested web page 7703. Those skilled in the art will recognize that the "airTravel" notation denotes an object in objected-oriented development parlance; specifically objects are demarcated by concatenating multiple worlds without spaces, and capitalizing all concatenated words except for the first word. Ergo, "airTravel" might be an example of an object concerned with the validation of air travel data entry.

Upon provision of the requested web page with the appropriate imbedded rules, the resulting web page is provided to the user 7704. Unlike with traditional techniques such as monolithic include files, only the validation logic required for the resulting web page is provided. Typically this results in the user viewing the resulting page in their web browser with the appropriate rules activated.

Upon provision of the resulting web page to the user, the user may provide information specific to the web page 7705. This information may be of any nature. Examples include, but are not limited to, order entry of information required to complete an online purchase of goods or services. Typically, the user simply enters information into provided fields.

As the user provides information, imbedded validation code validates the entries 7706. This validation may occur as the entry is being provided, or after a set of entries has been provided.

If the provided user information is not valid 7707, then the current web page will identify invalid entries with an error message 7708. In one embodiment this is done by highlighting the invalid entries employing standard HTML modification techniques. After the invalid information is identified, the user may edit their entries 7705.

Upon the user's provision of valid information 7707, the improved client validator will check if there are anymore entries required to complete an entry transaction 7709. If there are more entries required, the user is provided with the next form web page 7704. In one embodiment, all the rules and all the required web form sections are provided to the user in a single web page provision upon the first web page provision to the user 7704. Thus, subsequent cycling from 7707 to 7709 of multi-part web page forms require no interaction from an information server. Upon reaching the end of a web form 7709, the validated user information is posted to the information server 7710. In an alternative embodiment, validated user information is posted to the information server before the entry completion check 7709 and after the user's provision of valid information 7707.

Figure 8:
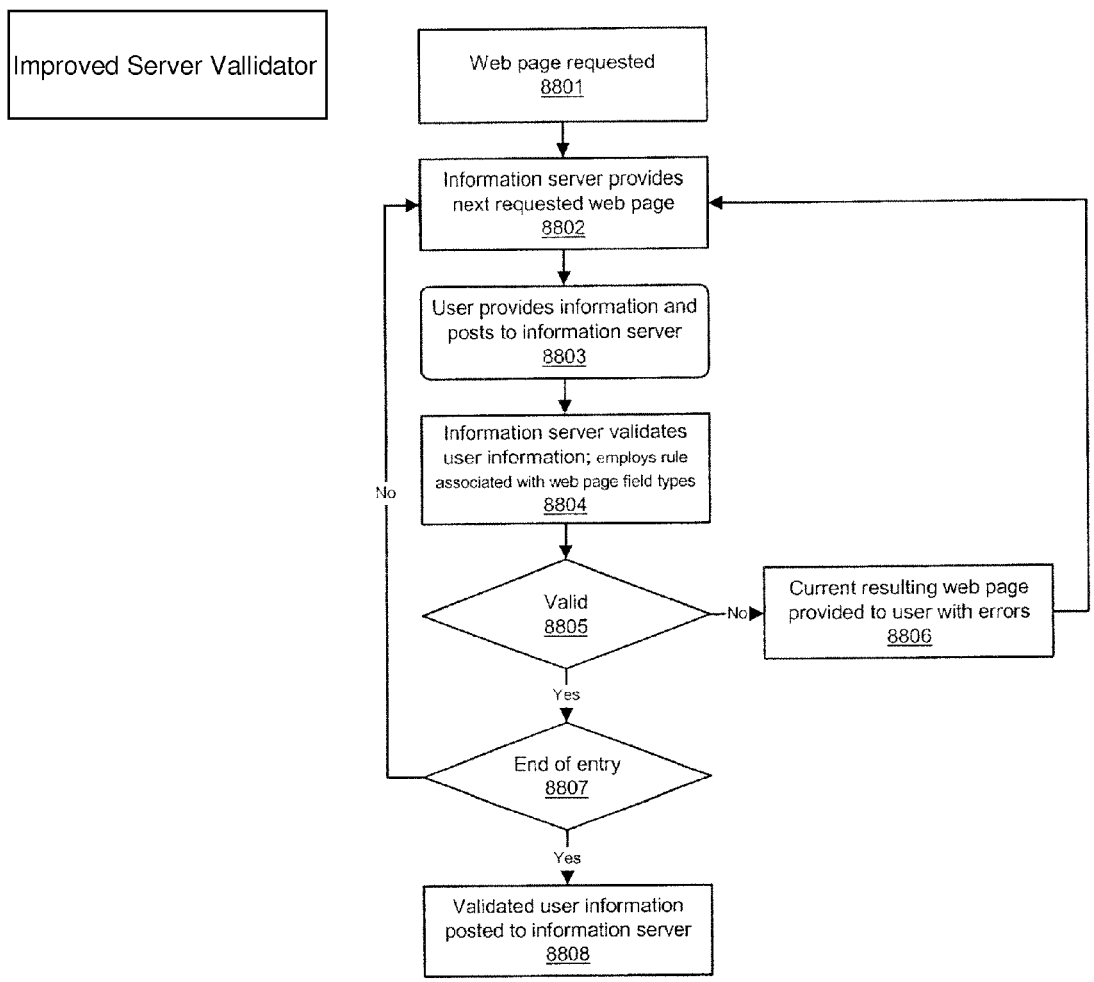
FIG. 8 is a flowchart illustrating an improved server validator.

FIG. 8 outlines an improved server validator system, further explaining how an improved validation scheme is applied to user information on a server when a browser does not support regex 6605 of FIG. 6. Based on the abilities of a user's web browsers, a web page is requested 8801. Of course, as described in FIG. 3 single and/or multiple users may make multiple uses of a single or multiple server validator systems. The information server provides and/or generates the requested page 8802 via standard web server techniques. Typically this results in the user viewing the resulting page in their web browser.

Upon the improved server validator system's provision of the requested web page, the user may provide information specific to the web page, thereafter posting their information to the information server 8803. This information may be of any nature. An Example includes, but is not limited to, the order entry of information required to complete an online purchase of goods or services. Typically, the user simply enters information into provided fields.

Upon having posted the user information to the information server, the improved server validator system validates the user information 8804 by accessing a rules library made available to the server. The rules library makes validation code available to the improved server validator. Preferably this validation code is JavaScript revision 1.2 or greater, however, this code may be provided through other like facilities such as, but not limited to: Microsoft Visual Basic Script, Java applets, C++, and others of the like. Employing JavaScript revision 1.2 or other such high level object oriented languages is believed to be preferable for savings in development time because a single development may be employed by both clients and servers, and furthermore inheritance techniques may be employed with greater facility. The information server provides rules from the rules library associated with web page field types; e.g. if the web page is marked as an airTravel type of page, a corresponding airTravel set of rules will be pulled from a rules library. However, unlike the improved client validator, no rules are imbedded into the web page. Instead, the rule code is executed on the server(s)' CPU(s).

If the provided user information is not valid 8805, then the current web page will identify invalid entries with an error message 8806. In one embodiment this is done by highlighting the invalid entries employing standard HTML modification techniques. Upon having modified the web page highlighting the errors, the information server provides the modified web page to the user 8802 and the user may edit their entries 8803.

Upon the user's provision of valid information 8805, the improved server validator will check if there are anymore entries required to complete an entry transaction 8807. If there are more entries required, the information server provides the user with the next form web page 8802. Thus, subsequent cycling from 8802 to 8807 of multi-part web pages are provided by the information server. Upon reaching the end of a web form 8807, the validated user information is posted to the information server 8808. In an alternative embodiment, validated user information is posted to the information server before the entry completion check 8807 and after the user's provision of valid information 8805.

Figure 9:
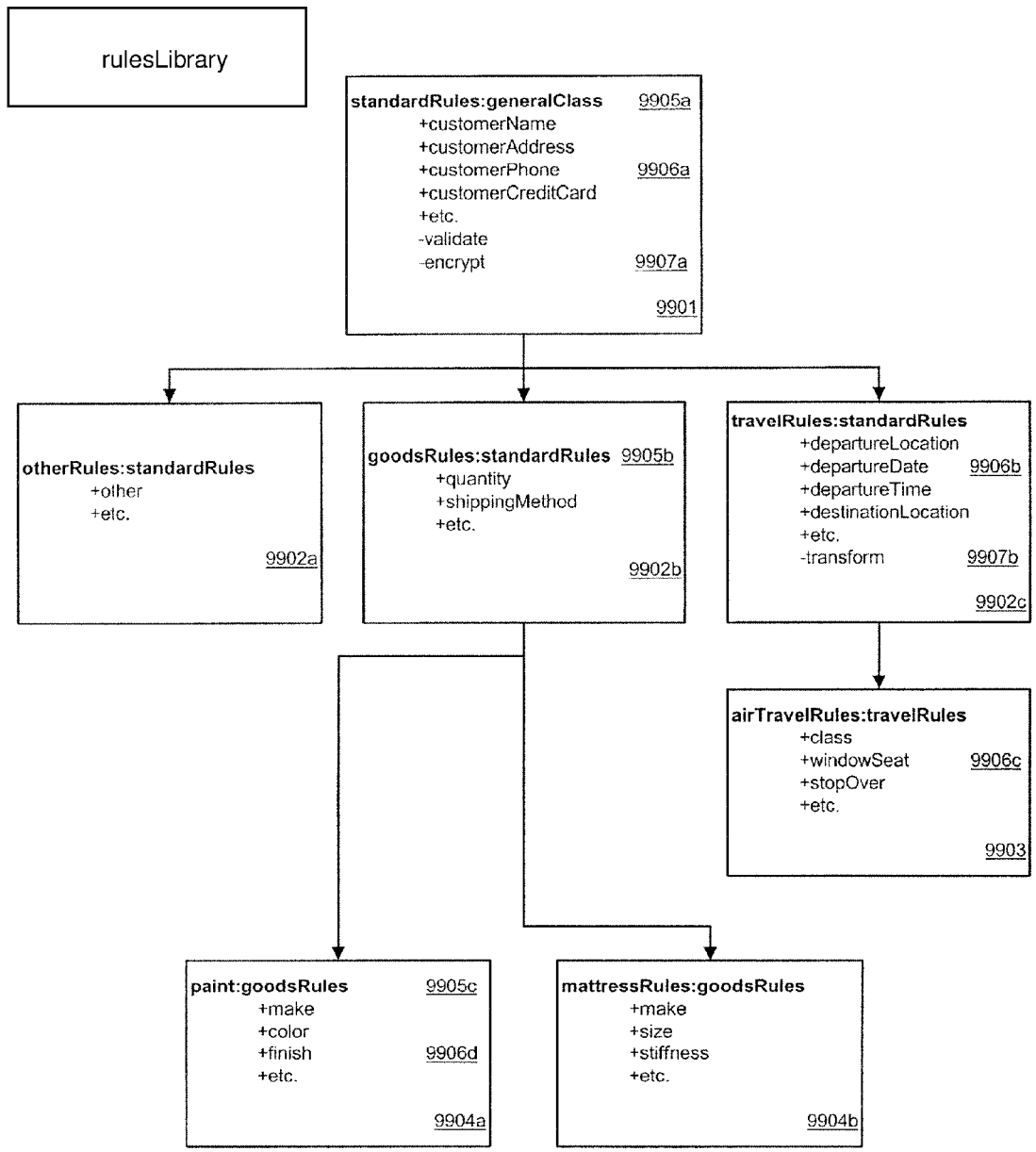
FIG. 9 is a flowchart illustrating one embodiment of a validation rules inheritance hierarchy.

FIG. 9 outlines a rules library system (i.e. rules library), further explaining how the improved validators (FIG. 7 and FIG. 8) perform validation. The rules library may be built with conventional development design tools; in one embodiment object oriented tools such as, but not limited to: Java, JavaScript, C++, Objective C, and others of the like. However, one skilled in the art will recognize that any turing complete language and/or development environment may be alternatively employed. Preferably a language such as JavaScript revision 1.2 is employed as it may run both on clients and on the server without modification to the rules library allowing for greater code reuse. In the preferred embodiment, the rules library is a central repository of validation rules organized in a class hierarchy as shown in FIG. 9. However, the rules library in alternative embodiments may be organized as collection(s) of files, entries in a database, and/or other structures of the like. The class hierarchy is born from a parent 9901. A parent class may have children 9902. Children are born, i.e. subclassed, from their parent. In turn, the children may also be subclassed and have their own children 9903, 9904. Subclassing provides children with an inheritance. The parent may have certain attributes 9906a in the form of instance variables (or other such standard data processing facilities) and abilities 9907a in the form of methods (or other such standard data processing facilities). When a parent is subclassed, its child inherits all of its attributes and abilities. Furthermore, the child may further redefine itself from its parent with additional attributes 9906b and abilities 9907b. This class hierarchy lineage may be reflected by illustrating the inheritance source 9905.

In one alternative embodiment, the validation rules may be associated with data types by marking data types with associated validation rules. Creating an association between data types (e.g. XML, web form fields, and or the like) and validation rules facilitate the application of validation rules upon a desired set of data. Creating the association reduces stress on computing resources by not having to first parse a web page to determine what types of validation rules ought to be applied. The creation of an association between data types and validation rules may be accomplished using standard data processing techniques such as, but not limited to: tagging web form elements by employing extensible markup language (XML) sheets. Associations with data types may be created by marking data types such as, but not limited to, fields with tags that may be used to locate and/or provide appropriate validation logic, i.e. an appropriate validation rule, from a rules library. In another alternative embodiment, a parser may examine the structure and provide appropriate validation logic based on the parser's best guess of the data type.

The provision of a rules library provides a single source for the improved client validator and the improved server validator for accessing validation rules. Although there may be a single rules library source, employing standard information technology, the rules library may be maintained in multiple locations for redundancy and performance purposes. A single source allows for the reuse of validation rules and thereby reduces development time. Also, allowing children to inherit from parent rules further reduces the time for developing new rules. For example, in FIG. 9, travelRules 9902c inherits the ability to validate and encrypt 9907 a various forms of customer information 9906a. Thus, when defining the new child, travelRules, there is no need to provide such attributes and abilities as they are automatically provided through inheritance. However, the travelRules child may further define departure and destination attributes 9906b and the ability to transform 9907b attributes; e.g. the ability to transform valid user time entries from a twelve hour time notation into a twenty-four hour notation or vice versa may be desirable. Furthermore, the child itself, travelRules, may be subclassed and further defined by airTravelRules adding more attributes 9906c such as class, windowSeat, etc.

This rules library may be accessed by the information server through standard APIs employing standard data processing techniques. In one embodiment, web page forms are tagged with a type marker in HTML. These type markers will allow the information server to employ an associated rule.

It is to be understood that the embodiments and variations shown and described herein are merely illustrative of the principles of this application and that various modifications may be implemented without departing from the scope and spirit of the application.

What is claimed is:

1. A data validation processor-implemented method, comprising:
receiving information over a communications network;
identifying a retriever's web browser capabilities;
retrieving validation rules appropriate for the retriever's web browser capabilities from a rules library stored in a memory device;
selecting a validation scheme based on the retriever's web browser capabilities, the validation scheme corresponding to a client-side validation if the web browser capabilities include regex enablement and to a server-side validation if the web browser capabilities do not include regex enablement;
imbedding the validation rules in a requested web page associated with a web page identifier when the validation scheme corresponds to the client-side validation; and
providing the requested web page for determination of computer data validity for application of the retrieved validation rules to the information.

2. The method of claim 1, further comprising highlighting information determined to be invalid by the validation rules.

3. The method of claim 1, wherein the validation rules are made available to client.

4. The method of claim 1, wherein the validation rules are made available to a server.

5. The method of claim 1, wherein the validation rules are executable both on a client and a server.

6. The method of claim 1, wherein the selection of the validation scheme comprises:
imbedding commands into a web page that will be executed upon the user's traversal if their web browser supports the processing of said commands.

7. A system comprising:
means for receiving information over a communications network;
means for identifying a retriever's web browser capabilities;
means for retrieving validation rules appropriate for the retriever's web browser capabilities from a rules library stored in a memory device;
means for selecting a validation scheme based on the retriever's web browser capabilities, the validation scheme corresponding to a client-side validation if the web browser capabilities include regex enablement and to a server-side validation if the web browser capabilities do not include regex enablement;
means for imbedding the validation rules in a requested web page associated with a web page identifier when the validation scheme corresponds to the client-side validation; and
means for providing the requested web page for determination of computer data validity for application of the retrieved validation rules to the information.

8. A non-transitory computer-readable medium storing a plurality of processing instructions, comprising executable instructions by a processor for:
receiving information over a communications network;
identifying a retriever's web browser capabilities;
retrieving validation rules appropriate for the retriever's web browser capabilities from a rules library stored in a memory device;
selecting a validation scheme based on the retriever's web browser capabilities, the validation scheme corresponding to a client-side validation if the web browser capabilities include regex enablement and to a server-side validation if the web browser capabilities do not include regex enablement;
imbedding the validation rules in a requested web page associated with a web page identifier when the validation scheme corresponds to the client-side validation; and
providing the requested web page for determination of computer data validity for application of the retrieved validation rules to the information.

9. An apparatus comprising:
a memory;
a processor disposed in communication with said memory, and configured to issue a plurality of processing instructions stored in the memory, wherein the processor issues instructions to:
receive information over a communications network;
identify a retriever's web browser capabilities;
retrieve validation rules appropriate for the retriever's web browser capabilities from a rules library stored in a memory device;

select a validation scheme based on the retriever's web browser capabilities, the validation scheme corresponding to a client-side validation if the web browser capabilities include regex enablement and to a server-side validation if the web browser capabilities do not include regex enablement;

imbed the validation rules in a requested web page associated with a web page identifier when the validation scheme corresponds to the client-side validation; and provide the requested web page for determination of computer data validity for application of the retrieved validation rules to the information.

10. A data validation processor-implemented method, comprising:

identifying data types requiring validation;

identifying, via a computer, a retriever's web browser capabilities;

providing validation rules appropriate for the retriever's web browser capabilities stored in a memory device for the associated data types from a rules library;

selecting a validation scheme based on the retriever's web browser capabilities, the validation scheme corresponding to a client-side validation if the web browser capabilities include regex enablement and to a server-side validation if the web browser capabilities do not include regex enablement; and wherein providing the validation rules further comprises imbedding the validation rules in a requested web page associated with a web page identifier when the validation scheme corresponds to the client-side validation.

11. The method of claim 10, wherein the validation rules are made available to a client.

12. The method of claim 10, wherein the validation rules are made available to a server.

13. The method of claim 10, wherein the validation rules are executable both on a client and a server.

14. A system, comprising:

means for identifying data types requiring validation;

means for identifying a retriever's web browser capabilities;

means for providing validation rules appropriate for the retriever's web browser capabilities stored in a memory device for the associated data types from a rules library;

means for selecting a validation scheme based on the retriever's web browser capabilities, the validation scheme corresponding to a client-side validation if the web browser capabilities include regex enablement and to a server-side validation if the web browser capabilities do not include regex enablement; and means for wherein providing the validation rules further comprises imbedding the validation rules in a requested web page associated with a web page identifier when the validation scheme corresponds to the client-side validation.

15. A non-transitory computer-readable medium storing a plurality of processing instructions, comprising executable instructions by a processor for:

identifying data types requiring validation;

identifying a retriever's web browser capabilities;

providing validation rules appropriate for the retriever's web browser capabilities stored in a memory device for the associated data types from a rules library;

selecting a validation scheme based on the retriever's web browser capabilities, the validation scheme corresponding to a client-side validation if the web browser capabilities include regex enablement and to a server-side validation if the web browser capabilities do not include regex enablement; and wherein providing the validation rules further comprises imbedding the validation rules in a requested web page associated with a web page identifier when the validation scheme corresponds to the client-side validation.

16. An apparatus, comprising:

a memory;

a processor disposed in communication with said memory, and configured to issue a plurality of processing instructions stored in the memory, wherein the processor issues instructions to:

identify data types requiring validation;

identify a retriever's web browser capabilities;

provide validation rules appropriate for the retriever's web browser capabilities stored in a memory device for the associated data types from a rules library;

select a validation scheme based on the retriever's web browser capabilities, the validation scheme corresponding to a client-side validation if the web browser capabilities include regex enablement and to a server-side validation if the web browser capabilities do not include regex enablement; and wherein the provision of the validation rules further comprises imbedding the validation rules in a requested web page associated with a web page identifier when the validation scheme corresponds to the client-side validation.

17. A data validation processor-implemented method comprising:

providing a rules library having an initial parent rule stored in a memory device;

identifying, via a computer, a retriever's web browser capabilities;

building validation rules appropriate for a retriever's web browser capabilities by subclassing members of a rules library class hierarchy;

selecting a validation scheme based on the retriever's web browser capabilities, the validation scheme corresponding to a client-side validation if the web browser capabilities include regex enablement and to a server-side validation if the web browser capabilities do not include regex enablement; and imbedding the validation rules in a requested web page associated with a web page identifier when the validation scheme corresponds to the client-side validation.

18. The method of claim 17, further comprising storing subclassed validation rules in the rules library.

19. The method of claim 17, wherein the subclassed validation rules inherit validation logic from a parent rule.

20. The method of claim 17, wherein the validation rules are associated with data types.

21. The method of claim 17, wherein the validation rules are executable both on a client and server.

22. The method of claim 17, wherein the rules library is maintained in multiple locations.

23. A system comprising:

means for providing a rules library having an initial parent rule stored in a memory device;

means for identifying retriever's web browser capabilities;

means for building validation rules appropriate for a retriever's web browser capabilities by subclassing members of a rules library class hierarchy;

means for selecting a validation scheme based on the retriever's web browser capabilities, the validation scheme corresponding to a client-side validation if the web browser capabilities include regex enablement and to a server-side validation if the web browser capabilities do not include regex enablement; and means for imbedding the validation rules in a requested web page associated with a web page identifier when the validation scheme corresponds to the client-side validation.

24. A non-transitory computer-readable medium storing a plurality of instructions, comprising executable instructions by a processor for:

providing a rules library having an initial parent rule stored in a memory device;

identifying retriever's web browser capabilities;

building validation rules appropriate for a retriever's web browser capabilities by subclassing members of a rules library class hierarchy;

selecting a validation scheme based on the retriever's web browser capabilities, the validation scheme corresponding to a client-side validation if the web browser capabilities include regex enablement and to a server-side validation if the web browser capabilities do not include regex enablement; and imbedding the validation rules in a requested web page associated with a web page identifier when the validation scheme corresponds to the client-side validation.

25. An apparatus, comprising:

a memory;

a processor disposed in communication with said memory, and configured to issue a plurality of processing instructions stored in the memory, wherein the processor issues instructions to:

provide a rules library having an initial parent rule stored in a memory device;

identify retriever's web browser capabilities;

build validation rules appropriate for a retriever's web browser capabilities by subclassing members of a rules library class hierarchy;

select a validation scheme based on the retriever's web browser capabilities, the validation scheme corresponding to a client-side validation if the web browser capabilities include regex enablement and to a server-side validation if the web browser capabilities do not include regex enablement; and imbed the validation rules in a requested web page associated with a web page identifier when the validation scheme corresponds to the client-side validation.

26. A data validation processor-implemented method comprising:

marking data types for associated validation rules from a rules library stored in a memory device;

identifying, via a computer, a retriever's web browser capabilities;

providing validation marked data types appropriate for the retriever's web browser capabilities;

selecting a validation scheme based on the retriever's web browser capabilities, the validation scheme corresponding to a client-side validation if the web browser capabilities include regex enablement and to a server-side validation if the web browser capabilities do not include regex enablement; and imbedding the validation rules in a requested web page associated with a web page identifier when the validation scheme corresponds to the client-side validation.

27. The method of claim 26, further comprising building forms with the validation rules associated with marked data types.

28. The method of claim 26, further comprising storing forms with the validation rules associated with marked data types.

29. The method of claim 26, further comprising providing forms with the validation rules associated with marked data types over a communications network.

30. The method of claim 26, wherein the validation rules are executable both on a client and a server.

31. A system, comprising:

means for marking data types for associated validation rules from a rules library stored in a memory device;

means for identifying a retriever's web browser capabilities;

means for providing validation marked data types appropriate for the retriever's web browser capabilities;

means for selecting a validation scheme based on the retriever's web browser capabilities, the validation scheme corresponding to a client-side validation if the web browser capabilities include regex enablement and to a server-side validation if the web browser capabilities do not include regex enablement; and means for imbedding the validation rules in a requested web page associated with a web page identifier when the validation scheme corresponds to the client-side validation.

32. A non-transitory computer-readable medium storing a plurality of instructions, comprising executable instructions by a processor for:

marking data types for associated validation rules from a rules library stored in a memory device;

identifying a retriever's web browser capabilities;

providing validation marked data types appropriate for the retriever's web browser capabilities;

selecting a validation scheme based on the retriever's web browser capabilities, the validation scheme corresponding to a client-side validation if the web browser capabilities include regex enablement and to a server-side validation if the web browser capabilities do not include regex enablement; and imbedding the validation rules in a requested web page associated with a web page identifier when the validation scheme corresponds to the client-side validation.

33. An apparatus, comprising:

a memory;

a processor disposed in communication with said memory, and configured to issue a plurality of processing instructions stored in the memory, wherein the processor issues instructions to:

mark data types for associated validation rules from a rules library stored in a memory device;

identify a retriever's web browser capabilities;

provide validation marked data types appropriate for the retriever's web browser capabilities;

select a validation scheme based on the retriever's web browser capabilities, the validation scheme corresponding to a client-side validation if the web browser capabilities include regex enablement and to a server-side validation if the web browser capabilities do not include regex enablement; and imbed the validation rules in a requested web page associated with a web page identifier when the validation scheme corresponds to the client-side validation.

34. A data validation processor-implemented method comprising:

receiving information from a user over a communications network, including at least a web page request;

identifying a retriever's web browser capabilities;

discerning a web page identifier associated with the web page request;

retrieving validation rules from a rules library stored in a memory device based on the web page identifier;

selecting a validation scheme based on the retriever's web browser capabilities, the validation scheme corresponding to a client-side validation if the web browser capabilities include regex enablement and to a server-side validation if the web browser capabilities do not include regex enablement;

providing a navigation location directing the user to the web page, the navigation location selected based on the validation scheme;

for the client-side validation,
 imbedding the validation rules in a web page associated with the web page identifier;

receiving a plurality of inputs to the web page from the user; and validating the inputs using the retrieved validation rules in accordance with the validation scheme.

35. A data validation processor-implemented method comprising:

accepting a request including at least a web page request from a user over a communications network;

determining features of a retriever's web browser;

discerning an identifier associated with the web page request;

gathering validation rules from a rules library stored in a memory device based on the web page identifier;

choosing a validation method according to the features of the retriever's web browser, the validation method being client-side validation if the web browser features include support for regex and server-side validation if the web browser features do not include support for regex;

providing a navigation location containing the requested web page to the user, the navigation location selected according to the chosen validation method;

receiving a plurality of inputs from the user at the navigation location; and validating the inputs using the gathered validation rules in accordance with the chosen validation method.

36. The method of claim 35, further comprising:
imbedding the validation rules in a web page associated with the web page identifier when the validation method chosen is the client-side validation method.

37. The method of claim 35, wherein the validation rules are inherited by children subclassed from parents.

38. The method of claim 35, wherein the identifier associated with the web page is a field type.

39. The method of claim 35, wherein the validation occurs as the inputs are being provided.

40. The method of claim 35, wherein the validation occurs after a set of inputs has been provided.

41. A data validation processor-implemented method comprising:

requesting a web page containing a web page identifier via a web browser over a communications network;

receiving the requested web page over the communications network, the requested web page featuring client-side validation if the web browser includes regex enablement, server-side validation if the web browser does not include regex enablement and traditional validation if the web browser includes non-regex enablement;

receiving imbedded validation rules associated with the web page identifier from a rules library stored in a memory device if the web browser includes regex enablement;

receiving information entered by a user into one or more forms in the web page;

validating the information entered by the user using the imbedded validation code associated with the web page identifier; and transmitting the validated information entered by the user over the communications network.

42. The method of claim 41, wherein the validation occurs as the information is being entered by the user.

43. The method of claim 41, wherein the validation occurs after a set of information has been entered by the user.

44. The method of claim 41, further comprising highlighting information determined to be invalid by the validation rules.

45. The method of claim 41, further comprising receiving in a single web page the one or more forms in the web page and the validation rules associated with the web page identifier, upon receiving the requested web page.

46. The method of claim 41, further comprising checking the completion of the information entry by the user.

47. The method of claim 41, further comprising transmitting the validated information over the communications network before the checking for completion and after the validation of the information provided by the user.

* * * * *